Figure 1:
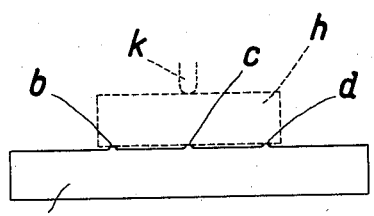

Dec. 31, 1935.        K. BÜTTNER        2,026,374
SUPPORTING GAUGE PLATE FOR THE MEASUREMENT OF DIMENSIONS
OF BODIES BOUNDED BY PARALLEL SURFACES
Filed July 6, 1933

Inventor:
Karl Büttner

Patented Dec. 31, 1935

2,026,374

UNITED STATES PATENT OFFICE 2,026,374

SUPPORTING GAUGE-PLATE FOR THE MEASUREMENT OF DIMENSIONS OF BODIES BOUNDED BY PARALLEL SURFACES

Karl Büttner, Jena, Germany, assignor to firm Carl Zeiss, Jena, Germany

Application July 6, 1933, Serial No. 679,205
In Germany July 13, 1932

1 Claim. (Cl. 33—174)

Persons skilled in the art have agreed upon defining the dimensions of a body bounded by two parallel end surfaces, for instance a block gauge, as the distance of the one end surface from a surface in hermetical contact with the other end surface and belonging to a body the material and superficial quality of which are equal to those of the first said body. When the two bodies are pressed together, they adhere very tightly to each other on account of the adhesion of the two contact surfaces and of the cohesion which is chiefly due to the oil and grease residues that have remained on these surfaces. As a rule, the effect of this contact is so strong that a considerable expenditure of strength is required when the two bodies are to be displaced relatively to each other without any interruption of the close contact, a displacement of this kind entailing eventually a deterioration of the quality of the two surfaces. Many measuring methods, however, require a displacement of the body along its support, and this in order to make this body and a standard body alternatively assume equal positions on the support.

With a view to avoiding the said disadvantages, it has been suggested to dispense with the close superficial contact and to place the body to be measured on three balls or on other bearing bodies, which means, however, that the result of a measurement will have nothing to do with, and may not be compared to, the result obtained according to the above-mentioned definition of length.

The invention aims at so reducing the undesired secondary effects obtaining in measurements made according to the said definition of length that these effects are practically of no importance, this result being attained by a reduction of the superficial area to which the body to be measured is to adhere. In other words, those support parts of the gauge plate which represent the working surface proper are constructed as laths of such breadths that a body adhering to them may be easily shifted to and fro. Experiments have shown that it is convenient to construct the working surfaces of the laths as surface slips of breadths of at most 0.7 millimetre and to make these slips parallel to each other. The laths may be straight or curved in any desired manner.

When especially block gauges are to be examined the measuring areas of which are standardized, as is well known, to 9 x 30 and 9 x 35 square millimetres, it is advisable to so dispose the laths that the distance apart of the middles of two slips of working surfaces is shorter than half the length of the measuring surfaces of the block gauges, that is to say shorter than 15 millimetres.

When not only comparison measurements but also absolute measurements are to be made by means of the gauge plate, it is advisable to so dispose the laths on the gauge plate between two larger areas of working surfaces that they lie across the distance apart of these areas. In this case, these larger areas are not used for the support of the bodies to be measured but for the reflection of light in interference measurements.

Figure 4:
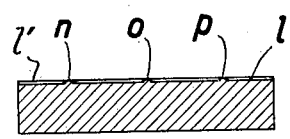
Figure 2:
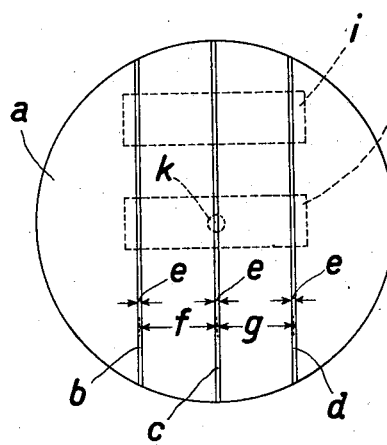
Figure 3:
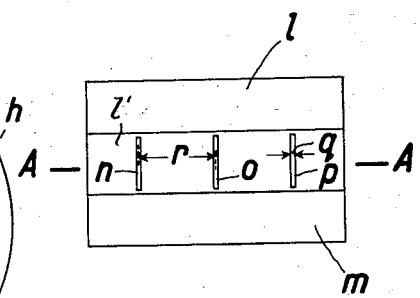

The accompanying drawing illustrates two constructional examples of the invention. Figures 1 and 2 represent the first example in elevation and in plan, respectively. The second example is represented by Figures 3 and 4, Figure 3 being a plan view and Figure 4 a section through line A—A in Figure 3.

The round gauge plate $a$ according to the first example has three laths $b$, $c$ and $d$ which are parallel to each other and whose surfaces are superficial slips of breadths $e=0.4$ millimetre. These slips lie in one common plane, and their median distances apart, $f$ and $g$, are 12.5 millimetres each.

If the thickness of a block gauge $i$ relative to that of a standard block gauge $h$ is to be measured, the two block gauges are made to adhere to the surfaces of the laths $b$, $c$ and $d$ in such manner as to assume the positions indicated by dash lines, the standard block gauge $h$ lying below the caliper $k$ of a fine measuring instrument. When the position of the caliper $k$ resting against the surface of the block gauge $h$ has been determined by means of an indicating device (which is not represented in the drawing) provided in the known manner in the measuring instrument, the caliper $k$ is raised and the two block gauges $h$ and $i$ are displaced in the direction of the rods $b$, $c$ and $d$ until the block gauge $i$ assumes the original position of the block gauge $h$. The caliper $k$ is made to touch the surface of the block gauge $i$, and the difference between the two adjustments of this caliper represents the sought deviation of the block gauge $i$ from the standard block gauge $h$. The chosen breadth of the slips, $e=0.4$ millimetre, provides for a sufficient adhesion and makes it possible to displace the block gauges without any considerable force being applied.

The gauge plate according to the second example (Figures 3 and 4) is quadrangular and has a longitudinal recess $l^1$. Its working surface consists of two comparatively broad oblong parts $l$ and $m$ and the surfaces of three laths $n$, $o$, $p$ transversely mounted in the recess $l^1$. These laths, which are so positioned as to cross the longer sides of the said oblong parts, are straight and parallel to each other. Their working surfaces are in one plane with the surface parts $l$ and $m$ and consist of superficial slips of breadths $q=0.3$ millimetre. The median distances $r$ apart of the laths are 12.5 millimetres each.

The gauge plate is meant especially for the measurement of absolute dimensions by means of an interference comparator, the block gauges, or the like, being made to adhere to the surfaces of the three laths $n$, $o$, $p$, and the surface parts $l$ and $m$ representing the plane of the length zero. The parts $l$ and $m$ are used for the reflection of the light rays and the interference measurement is made in the known manner.

I claim:

A supporting gauge-plate for the measurement of dimensions of bodies bounded by plano-parallel surfaces, comprising a plane surface, an oblong recess in this surface, and laths mounted in said recess adapted to support the bodies to be measured, the upper surfaces of these laths lying in the plane of the said plane surface and the laths crossing the longer axis of the said oblong recess, the breadths of the laths being considerably shorter than the distances apart of the laths and large enough to make a weak adhesion hold the bodies to be measured in hermetical contact with the laths.

KARL BÜTTNER.